(12) United States Patent
Orth et al.

(10) Patent No.: US 7,824,603 B2
(45) Date of Patent: Nov. 2, 2010

(54) DIRECT REDUCTION APPARATUS AND PROCESS

(75) Inventors: Andreas Orth, Friedrichsdorf (DE);
Heinz Eichberger, Bad Soden (DE);
Donald Keith Philp, Bibra Lake (AU);
Jeantine Van Gemund, legal representative, Bibra Lake (AU); Rod Dry, City Beach (AU)

(73) Assignee: Outotec Oyj, Espoo (FI)

( * ) Notice: Subject to any disclaimer, the term of this patent is extended or adjusted under 35 U.S.C. 154(b) by 520 days.

(21) Appl. No.: 11/569,734

(22) PCT Filed: May 20, 2005

(86) PCT No.: PCT/EP2005/005471

§ 371 (c)(1),
(2), (4) Date: Feb. 26, 2008

(87) PCT Pub. No.: WO2005/116275

PCT Pub. Date: Dec. 8, 2005

(65) Prior Publication Data

US 2008/0210055 A1    Sep. 4, 2008

(30) Foreign Application Priority Data

May 31, 2004    (AU)    ............................. 2004902901

(51) Int. Cl.
*C21B 13/02*    (2006.01)

(52) U.S. Cl. ...................................... 266/172; 266/267
(58) Field of Classification Search ................. 266/172, 266/265, 267
See application file for complete search history.

(56) References Cited

U.S. PATENT DOCUMENTS

| 3,753,685 A | | 8/1973 | Tajima et al. |
| 4,374,663 A | * | 2/1983 | Collin et al. .................. 75/448 |
| 2003/0090044 A1 | | 5/2003 | Li |

FOREIGN PATENT DOCUMENTS

| JP | 11131118 | 5/1999 |
| WO | 2004057038 | 7/2004 |

* cited by examiner

*Primary Examiner*—George Wyszomierski
*Assistant Examiner*—Tima M McGuthry-Banks
(74) *Attorney, Agent, or Firm*—Chernoff, Vilhauer, McClung & Stenzel

(57) ABSTRACT

An apparatus for reducing a metalliferous material in a fluidized bed includes a vessel for containing the fluidized bed, a mechanism for supplying the metalliferous material, a solid carbonaceous material, an oxygen-containing gas, and a fluidizing gas into the vessel for forming the fluidized bed in the vessel. The oxygen-containing gas supply mechanism includes one or more than one oxygen-containing gas injection lance having a lance tip with an outlet that is positioned for injecting the oxygen-containing gas in a downward flow into the vessel within a range of plus or minus 40° to the vertical.

23 Claims, 4 Drawing Sheets

DIRECT REDUCTION APPARATUS AND PROCESS

This is a national stage application filed under 35 USC 371 based on International Application No. PCT/EP2005/005471 filed May 20, 2005, and claims priority under 35 USC 119 of Australian Patent Application No. 2004902901 filed May 31, 2004.

The present invention relates to a direct reduction apparatus and process for a metalliferous feed material, particularly, although by no means exclusively, to the direct reduction of an iron-containing feed material, such as iron ore.

The present invention also relates to a process for reducing a metalliferous feed material that comprises a direct reduction process for partially reducing metalliferous feed material in the solid state and a smelting process for melting and further reducing the partially reduced metalliferous feed material to a molten metal.

The present invention was made during the course of an on-going research project carried out by the applicant to develop so called "CIRCOFER" technology for the direct reduction of iron ore.

CIRCOFER technology is a direct reduction process that is capable of reducing iron ore in the solid state to a metallisation of 50% or higher.

CIRCOFER technology is based on the use of fluidised beds. The main feed materials to the fluidised beds are fluidising gas, metal oxides (typically iron ore fines), solid carbonaceous material (typically coal) and oxygen-containing gas (typically oxygen gas). The main product produced in the fluidised beds is metallised metal oxides, i.e. metal oxides that have been at least partially reduced.

One of the findings of the applicant in the research project is that it is possible to minimise accretions within the fluidised beds and particularly on oxygen-containing gas injection lances by positioning the lances to inject oxygen-containing gas downwardly in the fluidised beds.

According to the present invention there is provided an apparatus for reducing a metalliferous material in a fluidised bed which comprises a vessel for containing the fluidised bed, a means for supplying the metalliferous material, a solid carbonaceous material, an oxygen-containing gas, and a fluidising gas into the vessel for forming the fluidised bed in the vessel, which apparatus is characterised in that the oxygen-containing gas supply means comprises one or more than one oxygen-containing gas injection lance having a lance tip with an outlet that is positioned for injecting the oxygen-containing gas in a downward flow into the vessel within a range of plus or minus 40 degrees to the vertical.

Preferably the lance tip is positioned for injecting the oxygen-containing gas in a downward flow in the vessel within a range of plus or minus 15 degrees to the vertical.

Preferably the lance tip is directed downwardly.

More preferably the lance tip is directed vertically downwardly.

Preferably the oxygen-containing gas injection lance is water-cooled.

Preferably at least the lance tip comprises an outer water-cooled jacket.

Preferably the oxygen-containing gas injection lance comprises a central pipe for the oxygen-containing gas.

Preferably the lance tip comprises a passageway located outwardly of the central pipe for injecting shrouding gas to reduce the possibility of accretions forming on the lance tip that could block the injection of the oxygen-containing gas.

Preferably the passageway for injecting the shrouding gas is an annulus in transverse section.

Preferably the passageway is an annulus in transverse section located between the central pipe and the outer water-cooled jacket.

Preferably a lower end of the central pipe is recessed relative to a lower end of the outer water-cooled jacket.

Preferably the central pipe has a chamfer extending from an internal surface to an outer surface of the pipe.

Preferably the lance is positioned so that the lance tip is in a central region of the vessel away from a side wall of the vessel.

The position of the oxygen-containing gas injection lance and, more particularly, the height of the outlet end of the lance tip within the vessel, are determined by reference to factors, such as the oxygen-containing gas injection velocity, the vessel pressure, the selection and amounts of the other feed materials to the vessel, and the fluidised bed density.

Preferably the lance extends downwardly through a top wall of the vessel.

Preferably the lance extends vertically downwardly through the top wall of the vessel.

Preferably the lance extends through the side wall of the vessel and then downwardly.

Preferably the lance extends horizontally through the side wall of the vessel and then downwardly.

According to the present invention there is provided a process for reducing a metalliferous material in a fluidised bed in a vessel which comprises supplying a metalliferous material, a solid carbonaceous material, an oxygen-containing gas, and a fluidising gas into the fluidised bed and maintaining the fluidised bed in the vessel, at least partially reducing metalliferous material in the vessel, and discharging a product stream that comprises the at least partially reduced metalliferous material from the vessel and a separate off-gas stream, which process is characterised by injecting the oxygen-containing gas into the vessel with a downward flow in a range of plus or minus 40 degrees to the vertical via one or more than one lance.

Preferably the process comprises injecting the oxygen-containing gas into a central region in the vessel, i.e. a region that is located inwardly of the side wall of the vessel, via a lance having a downwardly directed lance tip positioned inwardly of the side wall of the vessel.

Preferably the process comprises water-cooling the lance tip to reduce the possibility of accretions forming on the lance tip that could block the injection of the oxygen-containing gas.

Preferably the process comprises injecting the oxygen-containing gas with sufficient velocity to form a substantially solids-free zone in the region of the lance tip to decrease the possibility of accretions forming on the lance tip that could block the injection of the oxygen-containing gas.

Preferably the process comprises injecting the oxygen containing gas with a velocity in the range of 50-300 m/s.

Preferably the process comprises injecting nitrogen and/or steam and/or other suitable shrouding gas and shrouding a lower end of the lance tip to minimise oxidation of metal that could result in accretions on the lance tip that could block the injection of the oxygen-containing gas.

Preferably the process comprises injecting the shrouding gas into the vessel at a velocity that is at least 60% of the velocity of the oxygen-containing gas.

Preferably the process comprises supplying the metalliferous material, the solid carbonaceous material, the oxygen-containing gas, and the fluidising gas into the fluidised bed and maintaining the fluidised bed with (a) a downward flow of the oxygen-containing gas, (b) an upward flow of solids and fluidising gas countercurrent to the downward flow of the oxygen-containing gas, and (c) a downward flow of solids outwardly of the upward flow of solids and fluidising gas.

In the fluidised bed described in the preceding paragraph, solids in the upward and downward flows of solids are heated by heat generated by reactions between the oxygen-containing gas and the carbonaceous material and other oxidisable materials (such as CO, volatiles, and $H_2$) in a carbon-rich zone. The solids in the downward flow of solids transfer heat to a metal-rich zone in a lower part of the vessel.

The term "carbon-rich" zone is understood herein to mean a region in the fluidised bed in which there is a relatively large amount of carbon-containing material in relation to the amount of metalliferous material than in other regions of the fluidised bed.

The term "metal-rich" zone is understood herein to mean a region in the fluidised bed in which there is a relatively large amount of metalliferous material in relation to the amount of carbon-containing material than in other regions of the fluidised bed.

In addition, the upward and downward flows of solids shield the side wall of the vessel from radiant heat generated by reactions between the oxygen-containing gas and the solid carbonaceous material and other oxidisable solids and gases in the fluidised bed.

In the case of reducing metalliferous material in the form of iron ore fines, preferably the fines are sized at minus 6 mm.

Preferably the fines have an average particle size in the range of 0.1 to 0.8 mm One of the advantages of the process is that it can accept a substantial amount of metalliferous feed material with a particle size of less than 100 microns without a significant amount of this material exiting the process entrained in off-gas. This is believed to be due to an agglomeration mechanism operating within the fluidised bed that promotes a desirable level of agglomeration between particles of feed materials, particularly sub-micron particles, without appearing to promote uncontrolled agglomeration capable of interrupting operation of the fluidised bed. Similarly, friable ores that have a tendency to break down during processing and to thereby increase the proportion of particles in the fluidised bed with a size of less than 100 microns may be processed without significant loss of feed material in process off-gas.

Preferably the process comprises discharging the product stream comprising at least partially reduced metalliferous material from the lower section of the vessel.

The product stream also comprises other solids (for example char).

Preferably the process comprises separating at least a portion of the other solids from the product stream and returning the separated solids to the vessel.

The off-gas stream discharged from the vessel contains entrained solids from the vessel.

Preferably the process comprises separating entrained solids from the off-gas stream.

Preferably the process comprises maintaining a circulating fluidised bed and returning entrained solids to a lower portion of the vessel.

Preferably the process comprises preheating metalliferous feed material with the off-gas from the vessel.

Preferably the process comprises treating the off-gas after the preheating step and returning at least a portion of the treated off-gas to the vessel as the fluidising gas.

Preferably the off-gas treatment comprises one or more of (a) solids removal, (b) cooling, (c) $H_2O$ removal, (d) $CO_2$ removal, (e) compression, and (f) reheating.

Preferably the off-gas treatment comprises returning solids to vessel.

The process may be carried out as a single stage process in a single vessel.

The process may also be carried out as a multiple stage process in two or more vessels.

Preferably the multiple stage process comprises a first stage in which heat is generated by reactions between solid carbonaceous material and oxygen-containing gas in a fluidised bed in a first vessel and metalliferous material is reduced in a fluidised bed in a second vessel, with heat being supplied in part to the second fluidised bed via a stream of hot off-gas and entrained solids from the first fluidised bed.

Preferably oxygen-containing gas is also supplied to the second vessel.

More preferably the introduction of oxygen containing gas supplied to the second vessel is performed under such controlled conditions that a desirable agglomeration of smaller reduced ore particles with other particles of feed material to form larger reduced ore particles takes place.

The above-described multiple stage process separates in part the heat generation and reduction functions of the process into two separate vessels and makes it possible to optimise each of these functions.

The oxygen-containing gas may be any suitable gas.

Preferably the oxygen-containing gas comprises at least 90% by volume oxygen.

The present invention is described further with reference to the accompany drawings, of which:

The following description is in the context of direct reduction of a metalliferous feed material in the form of iron ore particles in the solid state. The present invention is not so limited and extends to direct reduction of other iron-containing materials (such as ilmenite) and more generally to other metalliferous materials.

The following description is also in the context of direct reduction of iron ore with coal as a solid carbonaceous material, oxygen as an oxygen-containing gas, and re-cycled off-gas as a fluidising gas. The present invention is not so limited and extends to the use of any other suitable solid carbonaceous material, oxygen-containing gas, or fluidising gas.

Figure 1:
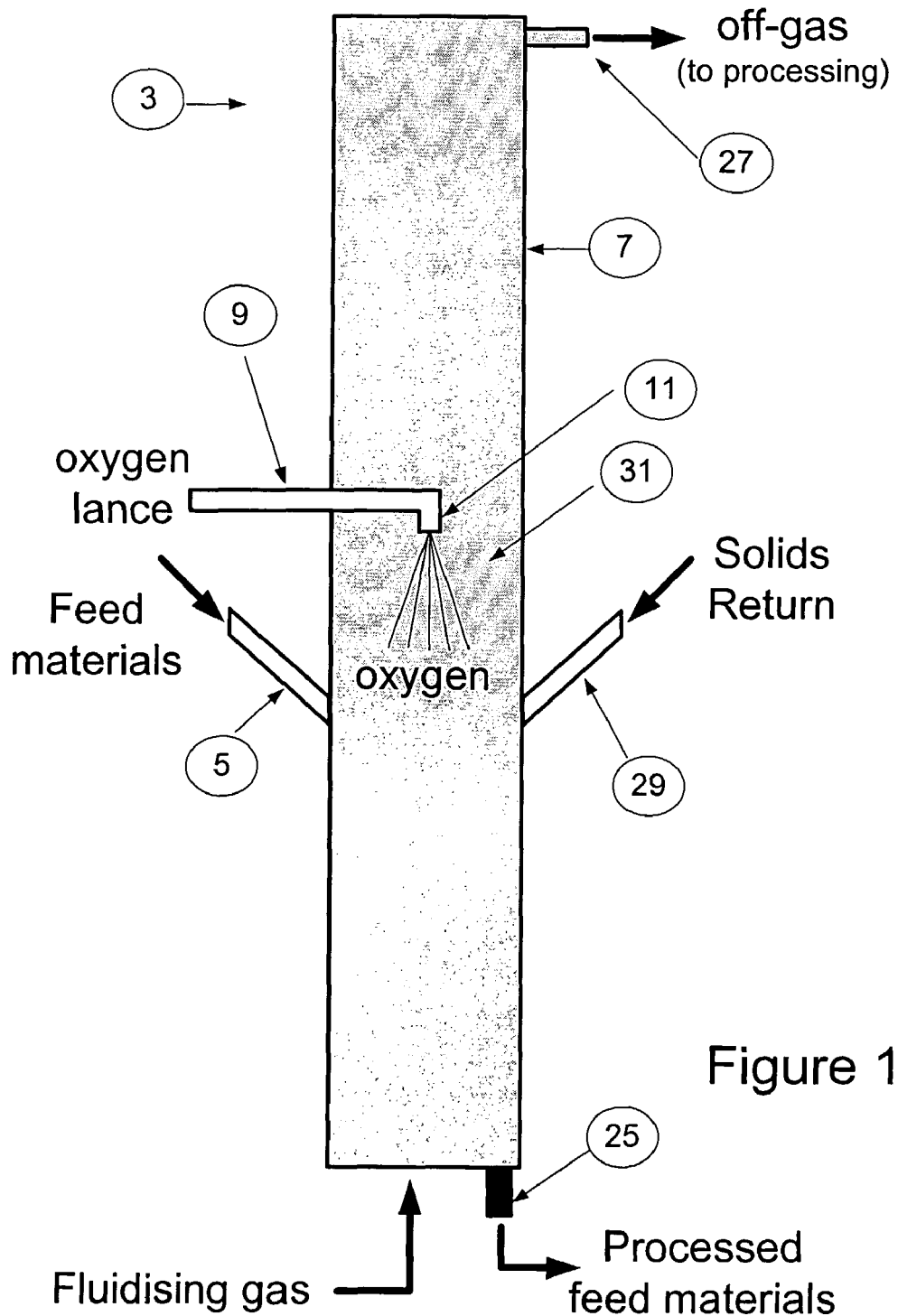
FIG. 1 is a diagram of an embodiment of an apparatus for direct reduction of a metalliferous feed material in accordance with the present invention.

With reference to the embodiment of the apparatus shown in FIG. 1, solid feed materials, namely iron ore fines and coal, oxygen and fluidising gas are introduced into a vessel 3 and establish a fluidised bed in the vessel.

The solid feed materials are supplied to the vessel 3 via a solids delivery device 5 such as a screw feed or a solids injection lance that extends through a side wall 7 of the vessel.

The fluidising gas is injected via a series of tuyeres or nozzles (not shown) in a base 13 of the vessel.

The oxygen is injected into the vessel via a lance 9 that has a downwardly extending lance tip 11 with an outlet 71 (FIG. 2) that is positioned away from the side wall 7 of the vessel 3 and directs the oxygen downwardly in a central region 31 of the vessel.

Figure 2:
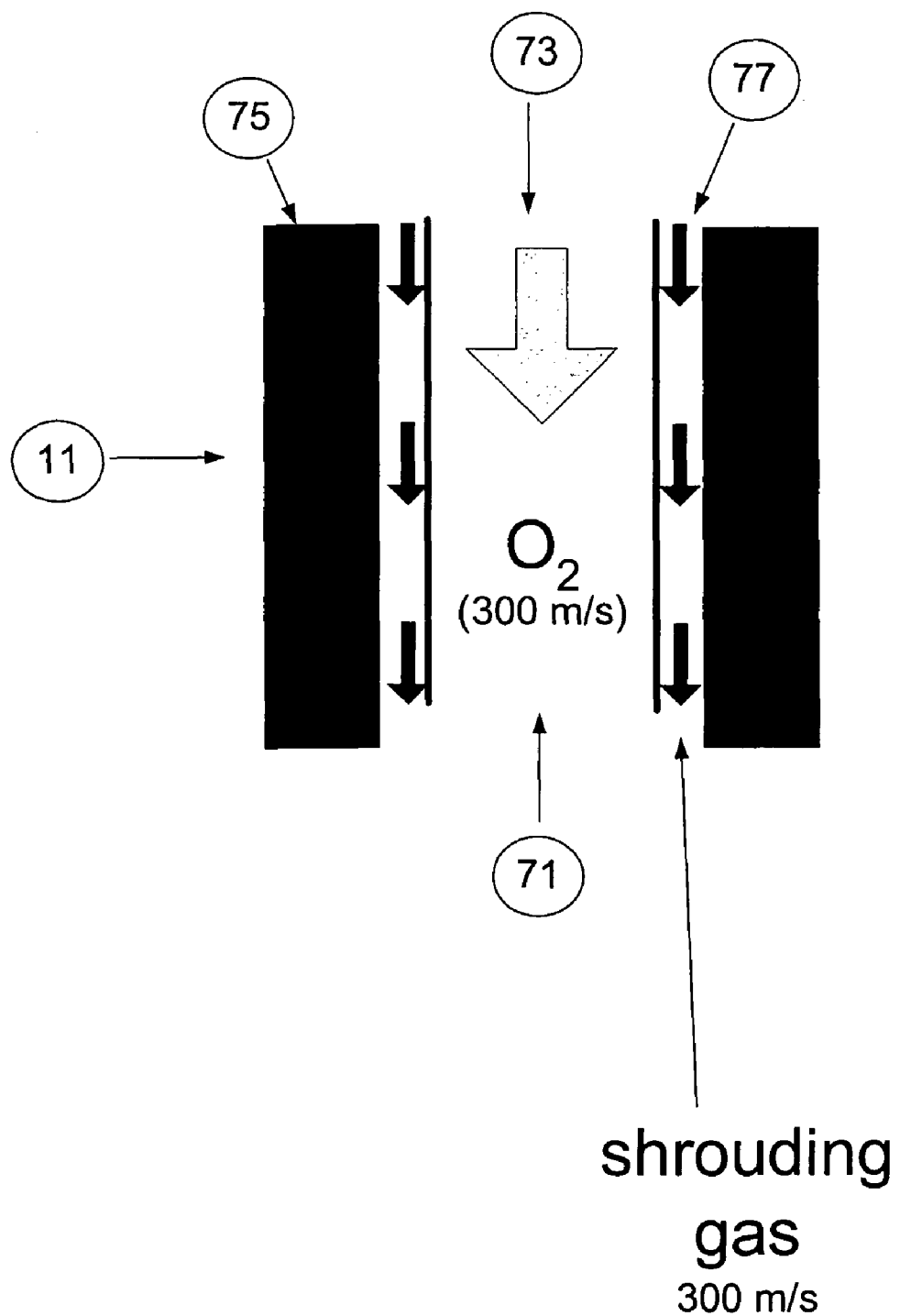
FIG. 2 is a diagram that illustrates the lance tip region of the oxygen gas injection lance shown in FIG. 1.
Figure 3:
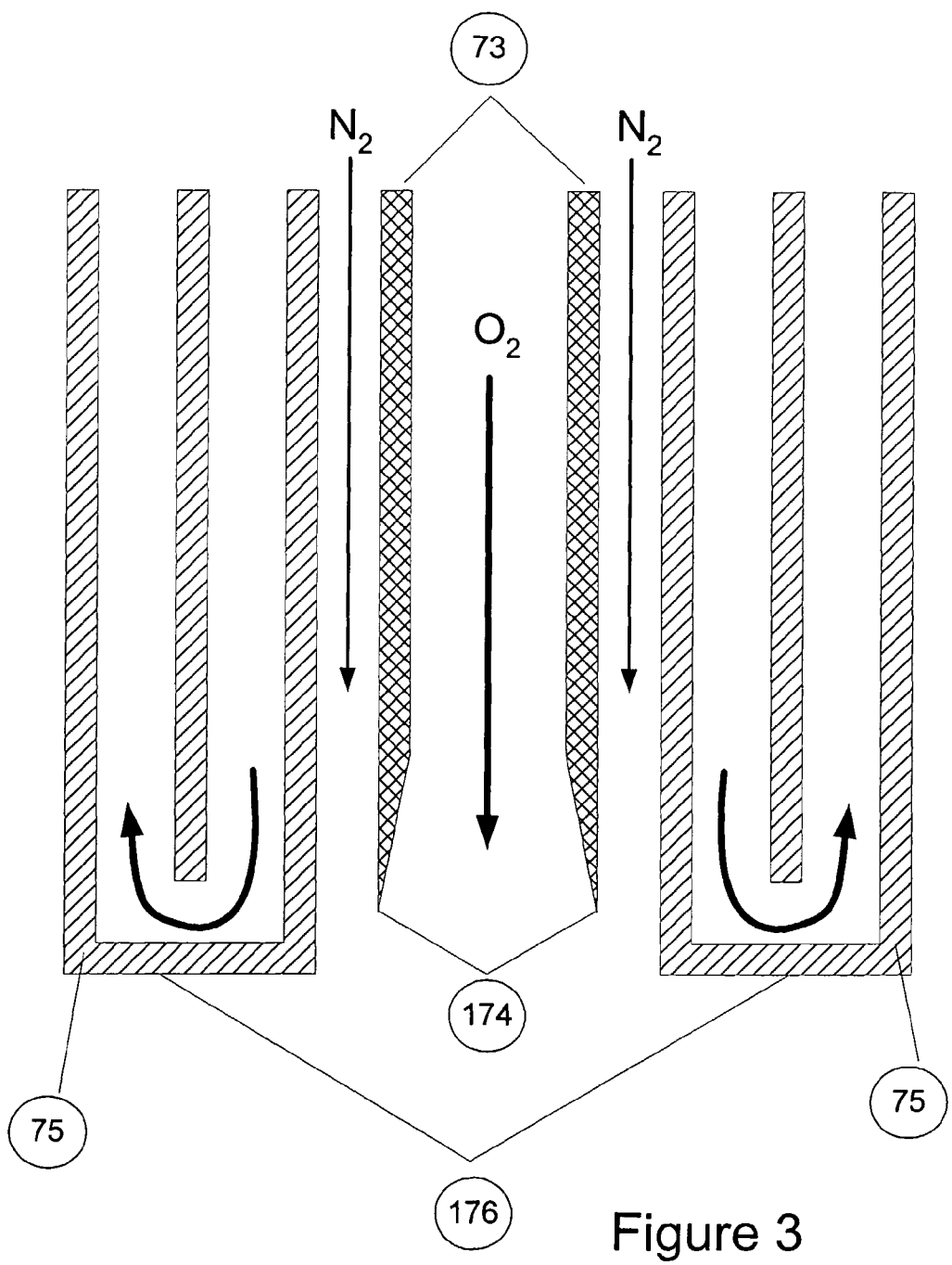
FIG. 3 is a schematic illustration showing the lance tip region of FIG. 2 in greater detail.

With reference to FIGS. 2 and 3, the lance tip 11 (and other sections of the lance 9 that extend into the vessel 3) comprises a central pipe 73 for oxygen, an outer water-cooled jacket 75, and a passageway 77 having an annular transverse section for nitrogen (or other suitable shrouding gas) between the central pipe 73 and the outer jacket 75. As can best be seen in FIG. 3, the central pipe 73 includes an internally located chamfer that extends from an internal wall of the pipe 73 to an external wall of the pipe and ends at a central pipe tip 174. The central pipe tip 174 is recessed relative to a lower end 176 of the water cooled jacket 75.

The above-described position of the lance tip 11 within the vessel 3 and the construction of the lance tip 11 are designed to minimise accretions forming on the lance tip 11 and in particular minimise accretions forming on the central pipe 73 that could block the outlet 71 and thereby interfere with efficient operation of the lance 9.

Specifically, positioning the lance tip 11 in a central region of the vessel, away from the side wall 7, minimises the possibility of the formation of accretions on the lance tip 11 and on the side wall 7. In addition, positioning the lance tip 11 so that it extends downwardly minimises the possibility of accretions adhering to the surface of the lance tip 11. In addition, the water-cooled jacket 75 maintains the outer surface of the lance tip 11 at a temperature that minimises accretions adhering to the lance tip 11. In addition, injecting the annular stream of the shrouding gas minimises reactions between solids and oxygen that could result in the formation of accretions on the lance tip. In addition, the internally located chamfer in the central pipe 73 minimises the possibility of the formation of accretions on the lance tip. The chamfer is understood to create a region of low pressure internally of the central pipe and adjacent the central pipe tip 174. This low pressure region is understood to draw shrouding gas across the central pipe tip 174. In this way the central pipe tip 174 is shrouded by shrouding gas. This prevents contact of particles with the central pipe tip 174 in the presence of oxygen. Contact under such conditions is believed to form accretions.

The outer surface of the lance may also be water cooled to minimise the formation of accretions or it may be coated with refractory.

In addition, the oxygen injection through the central pipe 73 has a sufficient velocity to form a particle free zone internally of the oxygen pipe to thereby further contribute to minimising the formation of accretions. Typically the oxygen is injected with a velocity in the range of 50-300 m/s.

The above-described injection of solids and gases produces an upward flow of fluidising gas and entrained solids in the central region of the vessel. Increasingly, as the solids move upwardly, the solids disengage from the upward stream of fluidising gas and flow downwardly, typically in an annular region between the central region and the side wall of the vessel. Ultimately, solids recirculated in the downward stream are entrained again in the upward stream of fluidising gas or are discharged from the vessel.

The above-described injection of solids and gases also produces the following reactions in the vessel.

Devolatilisation of coal to char and decomposition of coal volatiles to gaseous products (such as CO and $H_2$) and reaction of at least part of the char with oxygen to form CO.

Direct reduction of iron ore to at least partially reduced iron ore by gaseous products CO, and $H_2$. These reaction in turn produce $CO_2$ and $H_2O$.

Reaction of part of the $CO_2$ formed within the bed with carbon to form CO (Boudouard reaction)

Combustion of char, metallised ore, coal volatiles, CO, and $H_2$ with oxygen which generates heat that assists with maintaining the reactions described in the preceding dot points.

The relative densities of the solids and the above-described injection of the solids and the gases, including the locations of the solids/gas injection, results in reaction zones forming in the vessel. These zones may be contiguous.

One reaction zone is a carbon-rich zone in the region of the lance tip 11 of the lance 9. In this zone the predominant reactions are oxidizing reactions involving combustion of char, coal volatiles, CO, and $H_2$ with oxygen which generates heat.

Another reaction zone is a metal-rich zone in which coal is devolatilised and forms char and iron ore fines are at least partially reduced by CO, and $H_2$.

The above-described downward flow of solids in the annular region between the central region and the side wall 7 facilitates transfer of heat from the carbon-rich zone to the metal-rich zone.

In addition, the downward flow of solids partially shields the side wall 7 from direct exposure to radiant heat from the central region of the vessel.

The above-described process also produces a stream of off-gas and entrained solids that is discharged from the vessel via an outlet 27 in an upper section of the vessel. The off-gas stream is processed by separating solids from the off-gas and returning such solids to the vessel via a solids return leg 29. Thereafter, the off-gas is treated by a series of steps of (a) removing further solids from the off-gas, (b) cooling the off-gas, (c) $H_2O$ removal, (d) $CO_2$ removal, (e) compression of the remaining off-gas, and (f) reheating. The treated off-gas is thereafter returned to the vessel as part of the fluidising gas.

The above-described process produces a stream of solids, including at least partially reduced iron ore and char, that is discharged from the vessel via an outlet 25 in the base of the vessel. The solids stream may be processed by separating the at least partially reduced iron ore and part of the other solids. The separated other solids, predominantly char, may be returned to the vessel as a part of the solids feed for the process. The at least partially reduced iron ore is further processed as required. By way of example, the at least partially reduced iron ore may be supplied to a molten bath-based smelting vessel and smelted to molten iron, for example by a process such as the so called "HIsmelt process".

Figure 4:
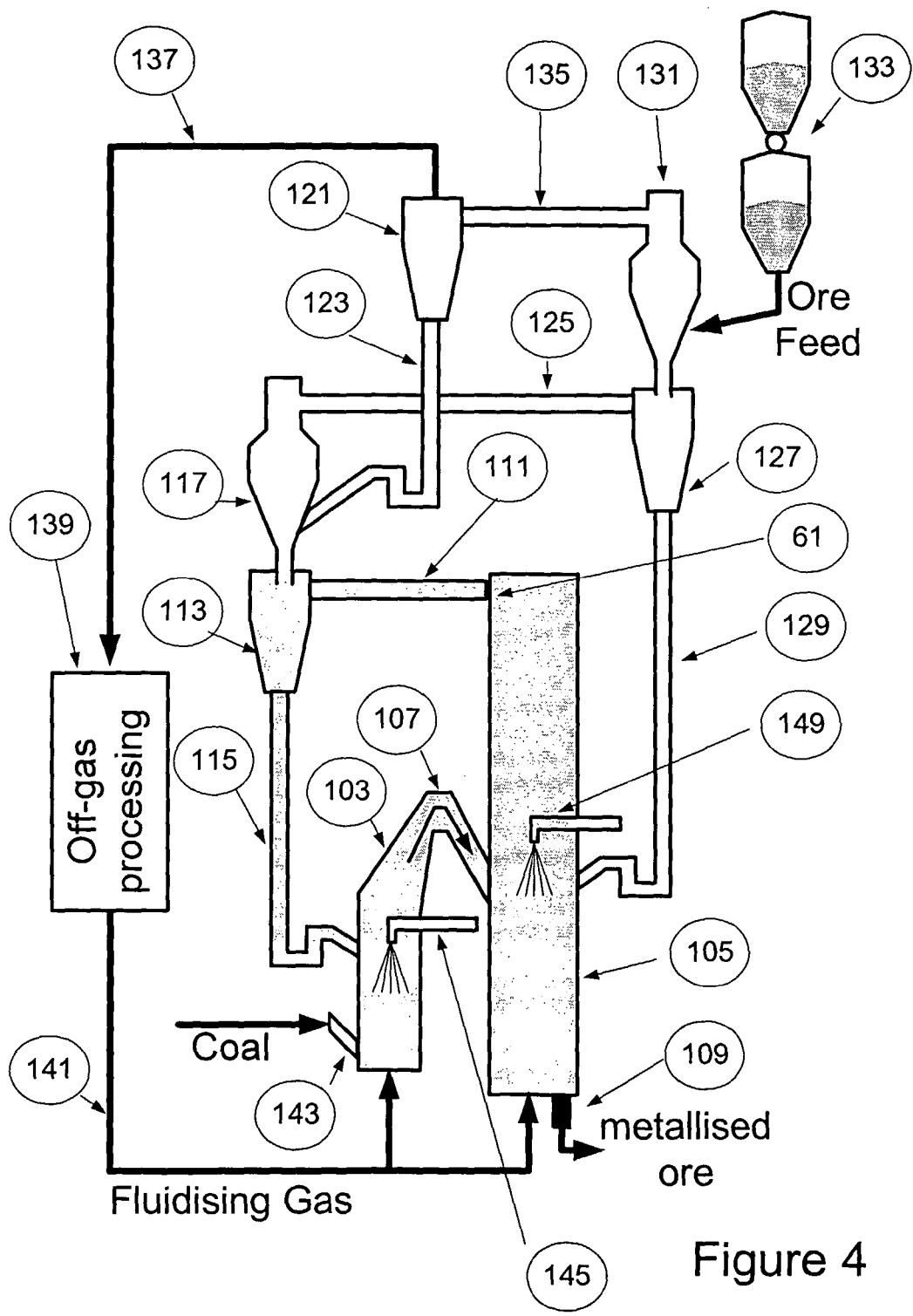
FIG. 4 is a diagram of another embodiment of an apparatus for direct reduction of a metalliferous feed material in accordance with the present invention.

With reference to FIG. 4, the embodiment of the apparatus shown in the Figure comprises a first vessel 103 that contains a fluidised bed of gas and entrained solids and a second vessel 105 that contains a fluidised bed of gas and entrained solids.

The first vessel 103 functions as a heat generator and generates a stream of hot off-gas containing entrained solids, predominantly char, that is transferred to the second vessel 105 via a line 107. The purpose of the hot off-gas stream is to provide at least part of the heat required for reactions in the second vessel.

The second vessel 105 functions as a direct reduction reactor and at least partially reduces iron ore fines in the solid state.

The second vessel produces two output streams.

One output stream, which is discharged from the second vessel 105 via an outlet 109 in the base of the second vessel 105, comprises a predominantly solids stream of at least partially reduced iron ore fines and entrained solids, typically char.

The solids stream may be processed by separating the at least partially reduced iron ore fines and the other solids. The other solids, predominantly char, may be returned to the first vessel and/or the second vessel as a part of the solids feed for the vessels. The at least partially reduced iron ore fines are further processed as required. By way of example, the at least partially reduced iron ore fines may be supplied to a molten bath-based smelting vessel and smelted to molten iron, for example by a process such as the HIsmelt process.

The other output stream from the second vessel 105 is discharged via an outlet 61 in an upper section of the second vessel 105, comprises hot off-gas and entrained solids. The off-gas stream is transferred to a cyclone 113 via a line 111. The cyclone 113 separates entrained solids from the off-gas stream. The solids flow downwardly from the cyclone 113 via a line 115 and into the first vessel 103 via return leg 155. The off-gas stream and any remaining solids flows upwardly from the cyclone 113 into a mixing chamber 117.

The off-gas passed to mixing chamber 117 from cyclone 113, mixes with and heats solids passed to the mixing chamber 117 from a further cyclone 121 via a line 123. A majority of the solids are carried over from the mixing chamber 117 as part of an output off-gas stream.

The output stream of off-gas and entrained solids from the mixing chamber 117 flows via a line 125 into a further cyclone 127. There is solids/gas separation in the cyclone 127. Separated solids flow downwardly from the cyclone 127 via a line 129 into the second vessel 105. Separated off-gas from the cyclone 127 along with any remaining solids flows upwardly from the cyclone 127 into a further mixing chamber 131.

The off-gas stream from the cyclone 127 mixes with and heats iron ore fines in the mixing chamber 131. The iron ore fines are supplied to the mixing chamber 131 via a lock hopper assembly 133. The majority of the iron ore feed is carried from mixing chamber 131 to cyclone 121 via line 135. Solids separation occurs in cyclone 121 such that a majority of the solids pass via line 123 to mixing chamber 117. As described previously, from mixing chamber 117, the solids pass to cyclone 127 via line 125. From cyclone 127 the majority of solids pass to the second vessel 105 via line 129.

The off-gas from the cyclone 121 is transferred via a line 137 to an off-gas processing unit 139 and is treated in the unit as described hereinafter. Specifically, the off-gas is treated by a series of steps of including (a) removing further solids from the off-gas, (b) cooling the off-gas, (c) $H_2O$ removal, (d) $CO_2$ removal, (e) compression, and (f) reheating.

The treated off-gas from the off-gas processing unit 139 becomes a fluidising gas for the vessels 103 and 105. It is transferred to the vessels via a transfer line 141. The fluidising gas is injected into the base of each vessel 103 and 105.

Medium-high volatile coal having a particle size of minus 6 mm is supplied into a lower section of the first vessel 103 via a lance 143 that extends through a side wall of the first vessel 103.

In addition, oxygen is supplied into the first vessel 103 via a lance 145 that has the same basic construction as the lance 45 in FIGS. 1, 2 and 3 and directs oxygen downwardly in a central region of the first vessel 103.

As is described above, preheated iron ore fines are supplied into the second vessel 105 via the line 129 and the hot off-gas stream containing entrained solids from the first vessel 103 is supplied into the second vessel via the line 107.

In addition, oxygen is supplied into the second vessel 105 via a lance 149 that has the same basic construction as the lance 9 in FIGS. 1 and 2 that directs the oxygen downwardly in a central region of the second vessel 105.

The above-described introduction of coal and fluidising gas into the first vessel 103 along with returned solids from return leg 115 produces an upward flow of fluidising gas and entrained solids in a central region of the first vessel 103. Increasingly, as the solids move upwardly, they disengage from the upward stream of fluidising gas and typically flow downwardly in an annular region between the central region and the side wall of the first vessel 103. Ultimately, retained solids in the downward stream of fluidising gas are entrained again in the upward stream of the fluidising gas.

The upward stream of fluidising gas and entrained solids in the central region of the first vessel 103 is countercurrent to the downward flow of oxygen gas.

In the first vessel the coal is devolatilised to char and coal volatiles which then decompose to gaseous products such as $H_2$. At least part of the char and the decomposed coal volatiles react with oxygen and form CO and other reaction products. These reactions generate substantial heat and, as is described above, the heat is transferred into the second vessel 105 by the hot output off-gas stream containing entrained solids that flows into the second vessel via the line 107.

The above-described introduction of the preheated iron ore fines, the hot off-gas stream containing entrained solids from the first vessel 103, the oxygen-containing gas, and the fluidising gas into the second vessel produces an upward flow of gas and entrained solids in a central region of the second vessel 105. Increasingly, as the solid particles move upwardly, the solid particles disengage from the upward stream of gas and flow downwardly in an annular region between the central region and the side wall of the second vessel 105. Ultimately, retained solids are either entrained again in the upward stream of the fluidizing gas or are discharged from the vessel via outlet 109.

The above-described introduction of the preheated iron ore fines, the hot off-gas stream containing entrained solids from the first vessel 103, the oxygen-containing gas, and the fluidising gas into the second vessel 105 produces the following reactions in the second vessel.

Reaction of at least part of the $CO_2$ (formed during reduction of iron ore) with carbon to form CO (Boudouard reaction).

Direct reduction of iron ore fines to at least partially reduced iron by gaseous products CO and $H_2$. These reactions in turn produce $CO_2$ and $H_2O$.

Oxidation of solids and gasses, such as partially reduced iron ore particles, char, $H_2$ and CO, in an upper section of the second vessel 105 which generates heat and promotes controlled agglomeration of smaller partially reduced ore particles with other particles within the fluidised bed.

The applicant does not have a totally clear understanding at this stage of the mechanism or mechanisms that enable controlled agglomeration of metalliferous material described in the last dot point above to be achieved. Nevertheless, without wishing to be bound by the following comments, in the research project the applicant observed that the agglomerates that formed comprise smaller particles, particularly fines that adhere to each other and to larger particles. The applicant speculates that the conditions in the carbon-rich zone, are such that (a) micron sized partially and completely reduced, i.e. metallised, iron ore particles react with oxygen and generate heat and the resultant oxidised particles become sticky (b) fine coal particles react with oxygen and oxidise and the resultant ash becomes sticky; and (c) fine iron ore particles become sticky as a consequence of being heated. The applicant also speculates that these smaller sticky particles adhere to larger particles that have a higher heat sink capacity, with the overall beneficial result that there is a reduction in the proportion of smaller particles in the vessel that can adhere to apparatus surfaces and be carried out from the vessel in an off-gas stream.

As is indicated above, the present invention was made during the course of an ongoing research project carried out by the applicant to develop CIRCOFER technology for the direct reduction of iron ore. The research project included a series of pilot plant runs on 350 mm diameter and 700 mm diameter pilot plant set-ups of the applicant.

The following discussion focuses on research work on the 700 mm diameter vessel pilot plant.

The pilot plant comprises an apparatus of the type shown in FIGS. 1 and 2. The pilot plant was operated as a circulating fluidised bed at atmospheric pressure. The vessel has a height of 10.7 m. An upper section of the vessel has a height of approximately 8.9 m and an internal diameter of 700 mm. A lower section of the vessel has a height of approximately 1.8 m and an internal diameter of 500 mm. This height of 1.8 m includes the height of a fluidising grate and a transition section between the 500 mm diameter and the 700 mm diameter sections. The vessel is refractory lined.

Off-gas from the vessel was processed to remove entrained solids by passing the off-gas successively through 3 cyclones connected in series. The first cyclone (cyclone 1) received off-gas directly from the vessel. Solids separated in the cyclone were returned to the vessel via a seal pot that provided for pressure sealing. The second cyclone (cyclone 2) received off-gas from cyclone 1. Solids separated in the cyclone were returned to the vessel via a direct return of solids (i.e. no seal pot). The third cyclone (cyclone 3) received off-gas from the second 2. Solids separated by cyclone 3 were not returned to the vessel.

After solids separation by the three cyclones, the off-gas was further treated by a radial flow scrubber, which further removed solids from the off-gas. These solids were concentrated by a thickener and then passed through a drum filter to produce thickener sludge.

Off-gas leaving the radial flow scrubber was then treated by a tube cooler that operated to dewater the off-gas by cooling it to within the range 10-30° C. Following treatment by the tube cooler, the off-gas was combusted.

The fluidised bed was fluidised by air during the initial stages of testing and was later fluidised by a mixture of nitrogen and hydrogen gas. As there were no provisions for processing and recycling the process off-gas, e.g. $CO_2$ removal and compression, it was not possible for it to be returned to the vessel as fluidising gas. In this regard, hydrogen gas was used to simulate the effect of using processed off-gas as fluidising gas.

In summary, the research work demonstrated the following:

The concept of a coal based fluidised bed reduction process with oxygen injection, producing a reduced product with metallisation levels of up to 78%.

Injecting oxygen into/or close to a fluidised bed with up to 42% metallic iron in the bed appears to be feasible without the formation of accretions.

The concept of simultaneously reducing iron ore and partially burning coal for energy in a single bed vessel appears to be feasible, at metallic iron loadings up to 48% in the product.

The position of the oxygen lance in the vessel is important because of the desirability of transferring the heat of oxidation back into the bed while minimising the level of iron reoxidation. The 4-m position is about right for the conditions tested.

High phosphorus Brockman iron ore was successfully fluidised and reduced without excessive dust make. (Brockman ore is a friable West Australian iron ore, made available by Hamersley Iron Pty Ltd, Perth, Western Australia.)

Objectives of the Experimental Program:

The primary objective was to achieve stable operation for a significant amount of time with high phosphorus Brockman ore (−3 mm) and Blair Athol coal.

The plan was to operate with low iron ore feed (up to 20% in product discharge) for two days with the oxygen lance in a low position (1.9-m above the distributor plate (not shown in the Figure) of the vessel. The aim was then to operate for three days with high ore feed (up to 70% in the product) with the oxygen lance in an upper position (3.8-m above the distributor plate).

Start-Up:

The campaign started on 9 Dec. 2003 at 0600 hrs with a gradual heat up of the 700-mm vessel (hereinafter also referred to as a "CFB") using alumina as the bed material. Once the target temperature was reached, coal and oxygen were introduced into the vessel at 1550 hrs. The oxygen rate was increased up to 105 $Nm^3$/hr while the coal rate was in the range 300-450 kg/hr.

Operation with Coal and Oxygen 10 Dec. 2003-11 Dec. 2003

Operation with coal, air and oxygen was conducted on 10 Dec. 2003. The operation was very smooth with the system stabilising fairly quickly and the vessel maintaining its temperature of 900-930° C. without any problems.

The standard operating conditions during this period were as follows.

CFB temperature: 930° C. bottom and 900° C. top

Fluidising gas flowrate: 140 $Nm^3$/hr ($N_2$) and 300 $Nm^3$/hr (air)

Pressure drop CFB: 80-140 mbar

Oxygen flowrate: up to 100 $Nm^3$/hr $N_2$ shield gas flowrate: 30 $Nm^3$/hr

Coal Feed Rate: 340-450 kg/hr

A summary of the results is as follows:

Bed Discharge Rate: 100-160 kg/hr

Cyclone 3 Discharge: 10-14 kg/hr

Offgas Analysis

| | |
|---|---|
| $CO/CO_2$ | 12.8/8.7 = 1.47 |
| % $H_2$ | 7.6 |
| % $CH_4$ | 0.7 |

The discharge product was clean with only some small +2 mm pieces which looked like residual refractory material. The dust make was reasonably low with <10% of the discharge reporting to the final cyclone discharge.

Operation with Iron Ore (10-140 kg/hr), Coal and Oxygen (lance 2-m height) 10 Dec. 2003-12 Dec. 2003

10 Dec. 2003 2200-11 Dec. 2003 0600: Iron Ore at 10 kg/hr

Iron ore (<3-mm) was introduced into the feed system at 2200 on 10 Dec. 2003 at a rate of 10 kg-hr. Hydrogen was also introduced into the fluidising gas at a rate of 20 $Nm^3$/hr to simulate use of processed off-gas as fluidising gas. The operation was smooth with the bed ΔP being maintained at about 100-120 mbar and the temperature profile having a range of only 10° C. between the bottom and the top of the bed.

The product appeared fine without any signs of accretions or agglomerates. However, on screening the product (at 2 mm) some larger scale type material was found but this was only a very small proportion of the overall product. The scale appeared to be made up of ash/char and probably formed on the walls of the vessel or distributor plate in the vessel.

The standard operating conditions and results during this period were as follows.

CFB temperatures: 930° C. bottom and 900° C. top

Fluidising gas flowrate: 350 Nm³/hr (N₂) and 20 Nm³/hr (H₂)

Pressure drop CFB: 100-130 mbar

Oxygen flowrate: 100-115 Nm³/hr

N₂ shield gas flowrate: 30 Nm³/hr

Coal Feed Rate: 280-360 kg/hr

Iron Ore Feed Rate: 10 kg/hr

A summary of the results is as follows:

Bed Discharge Rate: 125 kg/hr

Cyclone Discharge: 15 kg/hr

Offgas Analysis

| | |
|---|---|
| CO/CO₂ | 10.3/9.7 = 1.06 |
| % H₂ | 9.2 |
| % CH₄ | 2.0 |

11 Dec. 2003 0600-11 Dec. 2003 1200: Iron Ore at 20 kg/hr

The iron ore feed rate was increased up to 20 kg/hr at 0600 on 11 Dec. 2003 until 1200 11 Dec. 2003 and the hydrogen gas rate was also increased up to 40 Nm³/hr. The operation continued to be smooth without any disruptions. The vessel bed pressure was being maintained at about 80-100 mbar and the temperature profile had a range of only 10° C. between the bottom and the top of the bed.

The appearance of the product continued to be good without any signs of accretions or agglomerates. As before the only exception to this was the odd piece of scale type material, which appeared to be composed of ash/char.

The standard operating conditions and results during this period were as follows.

CFB temperatures: 952° C. bottom and 940° C. top

Fluidising gas flowrate: 350 Nm³/hr (N₂) and 40 Nm³/hr

Pressure drop CFB: 80-100 mbar

Oxygen flowrate: 112 Nm³/hr

N₂ shield gas flowrate: 30 Nm³/hr

Coal Feed Rate: 430 kg/hr

Iron Ore Feed Rate: 20 kg/hr

A summary of the results is as follows:

Bed Discharge Rate: 125 kg/hr

Cyclone 3 Discharge: 15 kg/hr

Offgas Analysis

| | |
|---|---|
| CO/CO₂ | 11.5/9.6 = 1.2 |
| % H₂ | 14.1 |
| % CH₄ | 2.6 |

Product Analysis: (0900 11 Dec. 2003)

| | Mass % | Fe(T) | Fe²⁺ | Fe° | % Met. |
|---|---|---|---|---|---|
| Magnetic | 9 | 58.2 | 15.5 | 42.35 | 72.8 |
| Non-Magnetic | 91 | 1.74 | | | |

11 Dec. 2003 1200-12 Dec. 2003 0600: Iron Ore at 40 kg/hr

Summary:

The iron ore feed rate was increased up to 40 kg/hr at 1200 on 11 Dec. 2003 and operated with this rate until 0600 12 Dec. 2003, while the hydrogen gas rate was maintained at 40 Nm³/hr and the coal rate was around 360-420 kg/hr. The operation continued to be smooth without any disruptions and the iron product discharge was highly metallised. Dust make was also low with less than 10% of the total discharge coming from the final cyclone (i.e. cyclone 3). The vessel bed ΔP was being maintained at about 90-135 mbar and the temperature profile had a range of less than 10° C. between the bottom and the top of the bed.

Results

The appearance of the product continued to be good without any signs of accretions or agglomerates.

The standard operating conditions and results during this period were as follows.

CFB temperatures: 953° C. bottom and 941° C. top

Fluidising gas flowrate: 370 Nm³/hr (N₂) and 40 Nm³/hr (H₂)

Pressure drop CFB: 98-130 mbar

Oxygen flowrate: 113 Nm³/hr

N₂ shield gas flowrate: 30 Nm³/hr

Coal Feed Rate: 426 kg/hr

Iron Ore Feed Rate: 40 kg/hr

A summary of the results is as follows:

Bed Discharge Rate: 190-210 kg/hr

Cyclone 3 Discharge: 15-20 kg/hr

Offgas Analysis

| | |
|---|---|
| CO/CO₂ | 9.9/11.4 = 0.87 |
| % H₂ | 12.9 |
| % CH₄ | 2.9 |

Product Analysis: (11 Dec. 2003)

| | | Mass % | Fe(T) | Fe²⁺ | Fe° | % Met. | % Fe° in Prod |
|---|---|---|---|---|---|---|---|
| 1500 11/12/03 | Magnetic | 30 | 74.38 | 14.59 | 57.44 | 77.2 | 25.8 |
| | Non-magnetic | 70 | 4.95 | | | | |
| 1900 11/12/03 | Magnetic | 34.8 | 71.56 | 19.33 | 50.75 | 70.9 | 26.8 |
| | Non-magnetic | 65.2 | 2.98 | | | | |
| 2300 11/12/03 | Magnetic | 27.4 | 66.4 | 20.22 | 45.66 | 68.8 | 21.1 |
| | Non-magnetic | 72.6 | 4.03 | | | | |
| 0200 12/12/03 | Magnetic | 24.6 | 67.1 | 22.1 | 42.53 | 63.4 | 19.7 |
| | Non-magnetic | 75.4 | 4.3 | | | | |
| 0600 12/12/03 | Magnetic | 19.6 | 68.86 | 22.55 | 43.48 | 61.8 | 15.7 |
| | Non-magnetic | 80.4 | 2.73 | | | | |

The high metallisation achieved (70-77%) indicates that the oxygen lance (even at its 1.9-m position) did not penetrate too far to the bottom of the bed and that there was good segregation within the bed. The lower part of the bed is iron rich. The higher part of the bed is carbon rich and this is interacting with the oxygen lance to generate heat and this heat is then transferred back into the bed by the recirculation of the solids to the lower parts of the bed. The low $CO/CO_2$ ratio in the off-gas indicates achievement of high post combustion, with the energy levels being transferred back into the bed, while maintaining high metallisation levels in the product discharge.

The iron levels in the product and the degree of metallisation indicates that the 700-mm vessel can be operated in gasification mode with up to 20-25% metallic iron content without any problems with accretions. This is a significant achievement.

Oxygen Lance Inspection (12 Dec. 2003)

The lance was taken out of the 700-mm vessel and inspected on 12 Dec. 2003.

In summary, the lance was clean. The water cooled pipe as well as the nozzle tip had no evidence of any buildup of material.

The lance was repositioned in the vessel at a higher position i.e. 3.8-m above the distributor plate. The vessel was restarted with coal and oxygen and then once stabilised iron ore and hydrogen.

Operation with Iron Ore (110-200 kg/hr), Coal and Oxygen (lance 4-m height)

0600-1200: Iron Ore at 110 kg/hr

Summary:

The iron ore feed rate was increased stepwise up to 110 kg/hr at 0625 and operated with this rate until 1200 while the hydrogen gas rate was also increased stepwise up to 110 $Nm^3$/hr over a 2 hr period. The coal rate was around 360-400 kg/hr. The operation continued to be smooth without any disruptions and the iron product discharge from the vessel was up to 78% metallised. Dust make was also low with <10% of the total discharge coming from the final cyclone (i.e. cyclone 3). The vessel bed ΔP was being maintained at about 90-135 mbar and the temperature profile had a range of less than 5° C. between the bottom and the top of the bed.

Increasing the lance height from 1.9 m to 3.8 m did not seem to impact on the bed temperature profile. In fact, the temperature spread was less than 5° C. from top to bottom.

Results:

The appearance of the product continued to be good without any signs of accretions or agglomerates.

The standard operating conditions and results during this period were as follows.

CFB temperatures: 953° C. bottom and 951° C. top

Fluidising gas flowrate CFB 10 $Nm^3$/hr ($N_2$) at 860° C., 110 $Nm^3$/hr ($N_2$) at 740° C., 180 $Nm^3$/hr ($N_2$) at 680° C., and 110 $Nm^3$/hr ($H_2$) at 860° C.

Pressure drop CFB: 80-100 mbar

Oxygen flowrate: 110 $Nm^3$/hr $N_2$ shield gas flowrate: 30-40 $Nm^3$/hr

Coal Feed Rate: 360-400 kg/hr

Iron Ore Feed Rate: 110 kg/hr

A summary of the results is as follows:

Bed Discharge Rate: 162 kg/hr

Cyclone 3 Discharge: 16 kg/hr

Offgas Analysis

| | |
|---|---|
| $CO/CO_2$ | 10.9/9.6 = 1.14 |
| % $H_2$ | 19.6 |
| % $CH_4$ | 2.3 |

Product Analysis: (13 Dec. 2003)

| | | Mass % | Fe(T) | $Fe^{2+}$ | $Fe°$ | % Met. |
|---|---|---|---|---|---|---|
| 1200 13/12/03 | Magnetic | 37.8 | 76.42 | 14.98 | 59.33 | 77.6 |
| | Non-magnetic | 62.2 | 2.66 | | | |

With the higher oxygen lance position the uniform bed temperature profile of the lower lance was maintained. This indicates that even with the oxygen lance at the 3.8 m position the solids recirculation profile is such that enough heat is transferred back into the bottom of the bed.

The temperature profile in the vessel and the cyclones indicated that there was probably no increase in dust make with the increase in iron ore feed rate up to 110 kg/hr. The discharge from the final cyclone relative to the vessel also did not change significantly. This suggests that either the iron ore is not breaking down as much as predicted or that any fines generated are re-agglomerated in the high temperature region of the oxygen lance.

13 Dec. 2003 1200-16 Dec. 2003 0500: Iron Ore at 120-230 kg/hr

Summary:

For the first period of this operation from 17:00 13 Dec. 2003 to 12:00 16 Dec. 2003 the operation rate was approximately 120 kg/h iron ore feed. This included a period of disturbance where there was no feed. The final period operated at approximately 230 kg/h iron ore feed.

The operation with 230 kg/hr iron ore feed rate was smooth without any disruptions and the iron product discharge from the CFB ranged from 48% to 78% metallised. Dust make was also low at <10% of the total discharge, coming from cyclone 3. The vessel bed ΔP was being maintained at about 80-100 mbar and the temperature profile range had now increased to about 20° C. between the bottom and the top of the bed.

Operating the vessel at the higher iron ore feed rate of 200 kg/hr increased the range of the CFB temperature profile with the bottom part of the bed now being up to 20° C. colder than the middle of the bed. The metallisation levels were also lower at the higher iron ore feed rates but they were still in the 60-80% metallisation range.

Results:

The appearance of the product continued to be good without any signs of accretions or agglomerates.

The standard operating conditions and results during this period were as follows.

CFB temperatures: 947° C. bottom and 960° C. top

FB gas heater temperature: 740° C. and 615° C. main heater

Fluidising gas flowrate CFB: 20 Nm³/hr (N₂) at 840° C., 100 20 Nm³/hr (N₂) at 740° C., 185 20 Nm³/hr (N₂) at 615° C., and 140 Nm³/hr (H₂) @ 840° C.

Pressure drop CFB: 83-96 mbar

Oxygen flowrate: 113 Nm³/hr

N₂ shield gas flowrate: 30-40 Nm³/hr

Coal Feed Rate: 380 kg/hr

Iron Ore Feed Rate: 200 kg/hr

A summary of the results is as follows:

Bed Discharge Rate: 227-286 kg/hr

Cyclone 3 Discharge: 18-24 kg/hr

Offgas Analysis (0400 hrs 15 Dec. 2003)

| | |
|---|---|
| CO/CO₂ | 11/10.4 = 1.06 |
| % H₂ | 16.5 |
| % CH₄ | 1.4 |

Product Analysis: (13-15 Dec. 2003)

| | | Mass % | C (T) | Fe(T) | Fe²⁺ | Fe° | % Met. |
|---|---|---|---|---|---|---|---|
| 1700 13/12/03 | Magnetic | 40.2 | — | 75.55 | 22.1 | 51.37 | 68.0 |
| | Non-magnetic | 59.8 | — | 8.11 | | | |
| 2000 13/12/03 | Magnetic | 54.2 | 1.8 | 78.35 | 15.33 | 61.18 | 78.1 |
| | Non-magnetic | 45.8 | 80.3 | 5.03 | | | |
| 1700 13/12/03 | Cyclone 3 discharge | | | 12.89 | 2.73 | 2.47 | 19.2 |
| 2000 13/12/03 | Cyclone 3 Discharge | | | 15.74 | 3.12 | 6.67 | 42.4 |
| 0200 15/12/03 | Magnetic | 51.3 | — | 78.85 | 19.6 | 58.87 | 74.7 |
| | Non-magnetic | 48.7 | — | 7.29 | | | |
| 0500 15/12/03 | Magnetic | 57.2 | — | 77.44 | 17.27 | 57.65 | 74.4 |
| | Non-magnetic | 42.8 | — | 4.55 | | | |
| 0700 15/12/03 | Magnetic | 62.8 | 0.9 | 76.93 | 17.38 | 58.43 | 75.9 |
| | Non-magnetic | 37.2 | 72.5 | 11.25 | | | |
| 0200 15/12/03 | Cyclone 3 Discharge | | | 20.29 | 7.77 | 5.38 | 26.5 |
| 0500 15/12/03 | Cyclone 3 Discharge | | | 21.73 | 7.69 | 6.28 | 28.9 |
| 12:00 15/12/03 | Magnetic | 59.2 | — | 76.9 | 18.1 | 56.6 | 73.6 |
| | Non-Magnetic | 40.8 | — | 31.0 | 4.7 | 22.0 | 70.9 |
| 16:00 15/12/03 | Magnetic | 62.7 | 1.9 | 73.6 | 32.5 | 36.0 | 48.9 |
| | Non-Magnetic | 37.3 | 53.6 | 27.6 | 8.4 | 13.2 | 48.0 |
| 22:00 15/12/03 | Magnetic | 59.6 | — | 71.5 | 28.0 | 39.0 | 54.5 |
| | Non-Magnetic | 40.4 | — | 20.4 | 3.9 | 11.0 | 54.0 |
| 02:00 16/12/03 | Magnetic | 53.3 | — | 74.1 | 26.8 | 43.5 | 58.7 |
| | Non-Magnetic | 46.7 | — | 13.7 | 3.7 | 2.8 | 20.1 |
| 04:00 16/12/03 | Magnetic | 62.7 | 1.6 | 74.4 | 29.5 | 40.0 | 53.8 |
| | Non-Magnetic | 37.3 | 63.8 | 16.8 | 5.7 | 5.4 | 32.2 |

At the high iron ore feed rates (200 kg/hr) the discharge from the vessel increased significantly while the discharge from the final cyclone only increased slightly. However, the discharge from the final cyclone relative to the vessel did not seem to change. It was further observed that the amount of fines <0.1 mm in the discharge was lower than the amount of fines <0.1 mm in the feed. This suggests that either the iron ore is not breaking down as much as predicted or that any fines generated are re-agglomerated in the high temperature region of the oxygen lance. The temperature profile through the cyclones also supports this since there were no significant increases in temperatures through the cyclone system at the higher iron ore feed rates. The product metallisation levels were maintained in the range of 68-78% during the high iron ore feed rates while the product discharge had up to 48% metallic iron.

Oxygen Lance and Vessel Inspection (16 Dec. 2003 and 19 Dec. 2003)

The lance was taken out of the 700-mm vessel and inspected on 16 Dec. 2003. In summary, the lance was fairly clean. The water cooled pipe had a thin coating of material while the nozzle tip was relatively clean. The nature of the build up (flaky and thin) suggested that this would not lead to any operational problems.

Iron Distribution & Agglomeration

Analysis of the Brockman ore sample used as feed to the fluidised bed indicated a fines content of approximately 10.6% sub 45 micron. These units were expected to appear as output from cyclone 3 or as thickener sludge. Due to the friable nature of Brockman Ore, it was expected that additional fines would be produced during processing. It was therefore expected that the percentage of iron units exiting the system through cyclone 3 would exceed 10.6%.

It was observed that approximately 7% of the iron units input to the fluidised bed were discharged through cyclone 3, either as direct output from cyclone 3 (approximately 4%) or as output from the radial flow scrubber (approximately 3%). Analysis of the main product output from the fluidised bed indicated that an agglomeration mechanism was present within the process. This mechanism appeared to be primarily smaller particles, typically sub 100 micron particles, agglomerating to each other and to larger particles.

Many modifications may be made to the embodiments of the present invention shown in FIGS. 1 thru 4 without departing from the spirit and scope of the invention.

The invention claimed is:

1. Apparatus for reducing a metalliferous material in a fluidized bed which comprises a vessel for containing the fluidized bed, a means for supplying the metalliferous material, a solid carbonaceous material, an oxygen-containing gas, and a fluidizing gas into the vessel for forming the fluidized bed in the vessel, wherein the oxygen-containing gas supply means comprises at least one oxygen-containing gas injection lance having a lance tip with an outlet that is positioned for injecting the oxygen-containing gas downward into the vessel at up to 40 degrees to the vertical, wherein the oxygen-containing gas injection lance comprises a central pipe for the oxygen-containing gas and a passageway located outwardly of the central pipe for injecting shrouding gas.

2. Apparatus according to claim 1, wherein the lance tip is positioned for injecting the oxygen-containing gas downward into the vessel at up to 15 degrees to the vertical.

3. Apparatus according to claim 1, wherein the lance tip is directed downwardly.

4. Apparatus according to claim 1, wherein the oxygen-containing gas injection lance is water-cooled.

5. Apparatus according to claim 4, wherein at least the lance tip comprises an outer water-cooled jacket.

6. Apparatus according to claim 1, wherein the passageway for injecting the shrouding gas is an annulus in transverse section.

7. Apparatus according to claim 6, wherein the annulus in transverse section is located between the central pipe and an outer water-cooled jacket.

8. Apparatus according to claim 7, wherein a lower end of the central pipe is recessed relative to a lower end of the outer water-cooled jacket.

9. Apparatus according to claim 1, wherein the central pipe has a chamfer extending from an internal surface to an outer surface of the pipe.

10. Apparatus according to claim 1, wherein the lance is positioned so that the lance tip is in a central region of the vessel away from a side wall of the vessel.

11. Apparatus according to claim 1, wherein the lance extends downwardly through a top wall of the vessel.

12. Apparatus according to claim 11, wherein the lance extends vertically downwardly through the top wall of the vessel.

13. Apparatus according to claim 1, wherein the lance extends through the side wall of the vessel and then downwardly.

14. Apparatus according to claim 1, wherein the lance extends horizontally through the side wall of the vessel and then downwardly.

15. Apparatus according to claim 1, wherein the carbonaceous material supply means comprises a solids delivery device for supplying carbonaceous material to a location below the lance tip.

16. Apparatus according to claim 15, wherein the solids delivery device comprises a solids injection lance or screw feed extending into the vessel at a location below the lance tip.

17. Apparatus according to claim 1, wherein the carbonaceous material supply means and the metalliferous material supply means comprise a solids delivery device for supplying carbonaceous material and metalliferous material to a location below the lance tip.

18. Apparatus according to claim 17, wherein the solids delivery device comprises a solids injection lance or screw feed extending into the vessel at a location below the lance tip.

19. Apparatus according to claim 1, wherein the passageway located outwardly of the central pipe is an annular passageway surrounding the central pipe and surrounded by an outer jacket, and the central pipe is connected to a source of oxygen-containing gas, the annular passageway is connected to a source of shrouding gas, and the outer jacket is connected to a source of cooling water.

20. Apparatus according to claim 1, wherein the passageway for injecting shrouding gas is located between the central pipe and an outer water-cooled jacket, and a lower end of the central pipe is recessed relative to a lower end of the outer water-cooled jacket.

21. Apparatus according to claim 1, wherein the lance extends substantially horizontally through a side wall of the vessel and the lance tip extends substantially vertically downward at a location spaced from the side wall of the vessel.

22. Apparatus according to claim 1, wherein the oxygen-containing gas supply means comprises a source of oxygen-containing gas connected to the central pipe of the injection lance and the apparatus further comprises a source of shrouding gas connected to said passageway.

23. Apparatus according to claim 22, wherein the source of oxygen-containing gas comprises a source of oxygen and the source of shrouding gas comprises a source of a gas that comprises nitrogen or steam.

* * * * *